Jan. 2, 1962 J. H. APEL ETAL 3,015,259
PAVING MATERIAL SPREADER
Filed Jan. 26, 1960 10 Sheets-Sheet 1
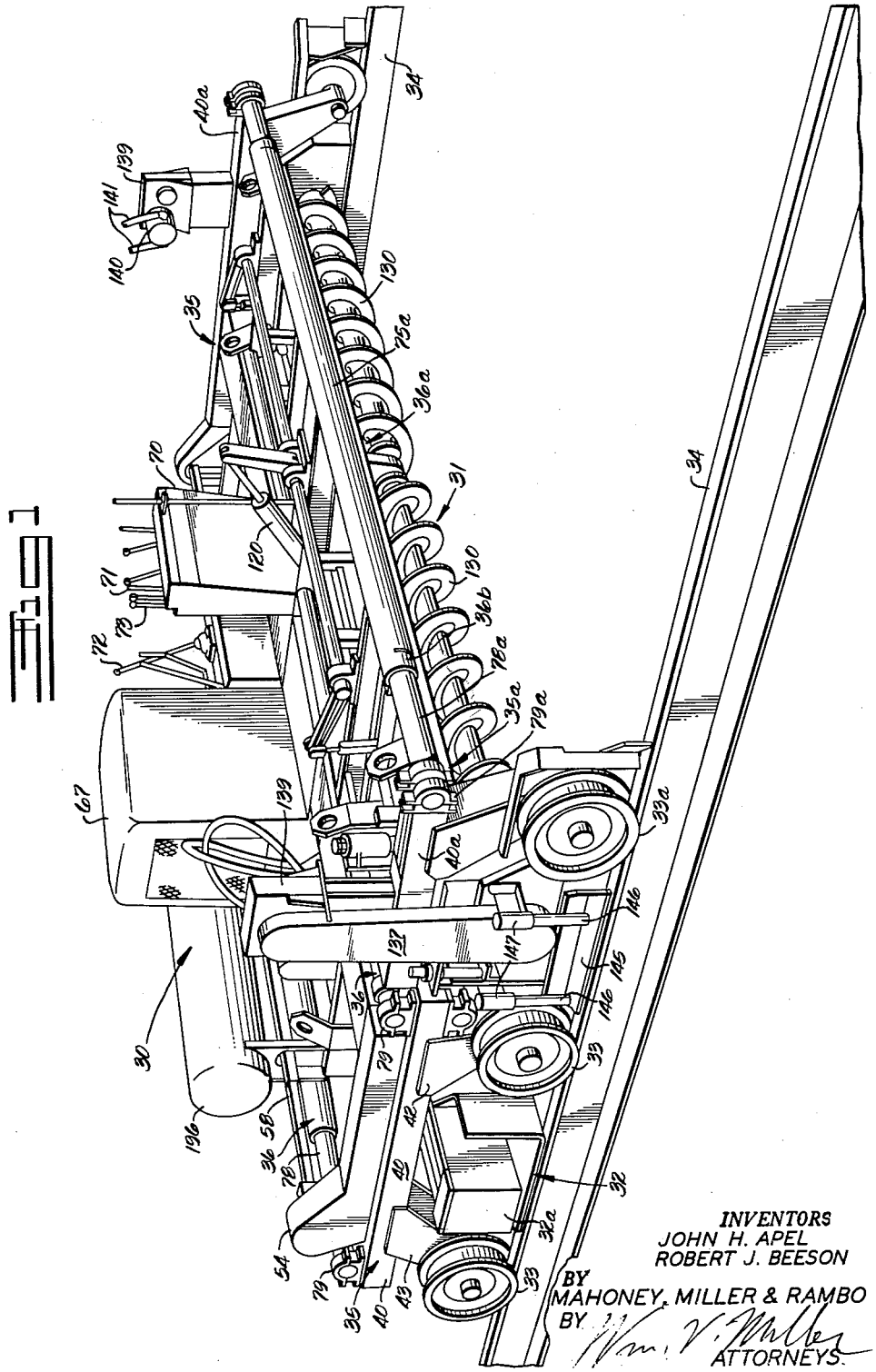
INVENTORS
JOHN H. APEL
ROBERT J. BEESON
BY MAHONEY, MILLER & RAMBO
BY
ATTORNEYS

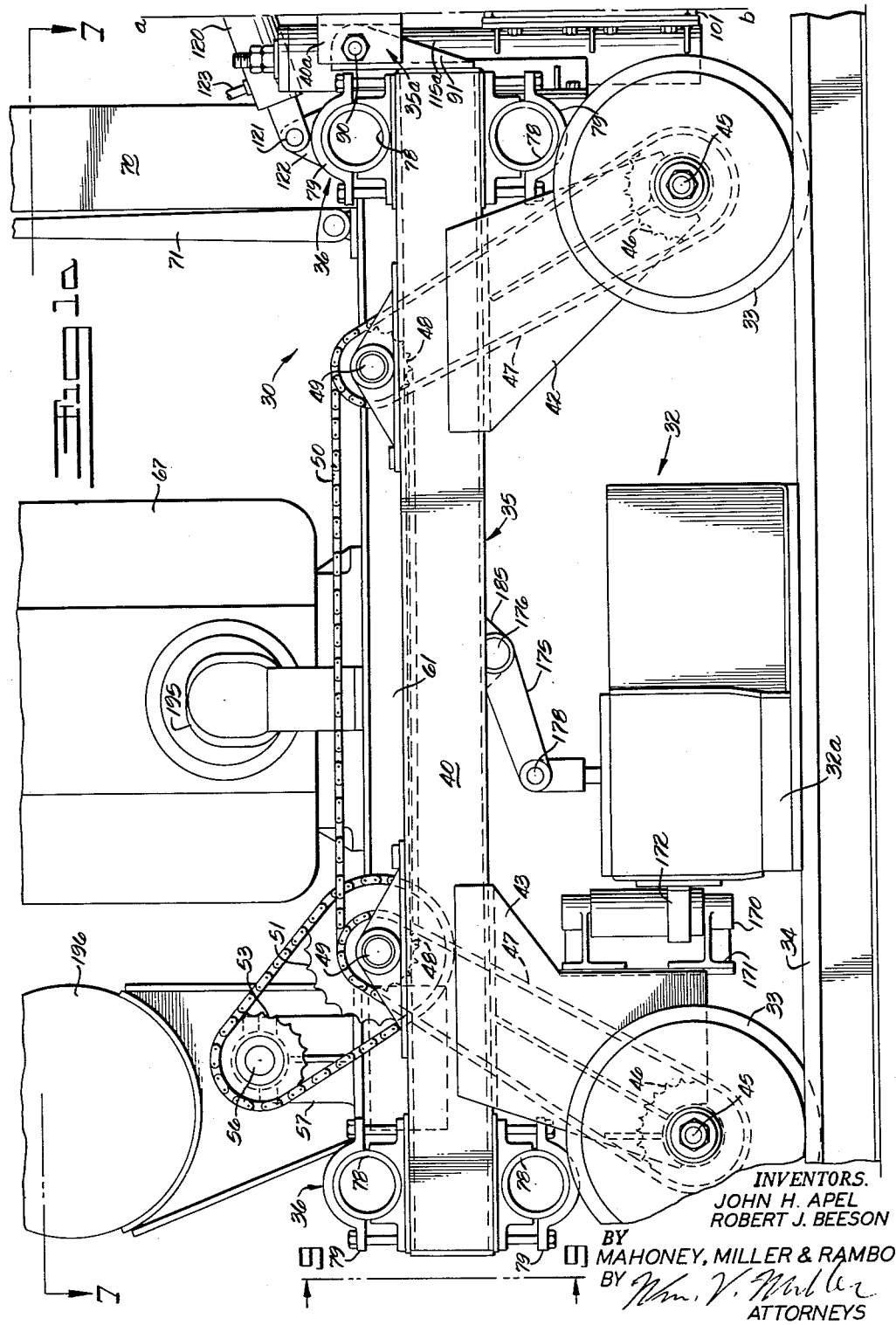

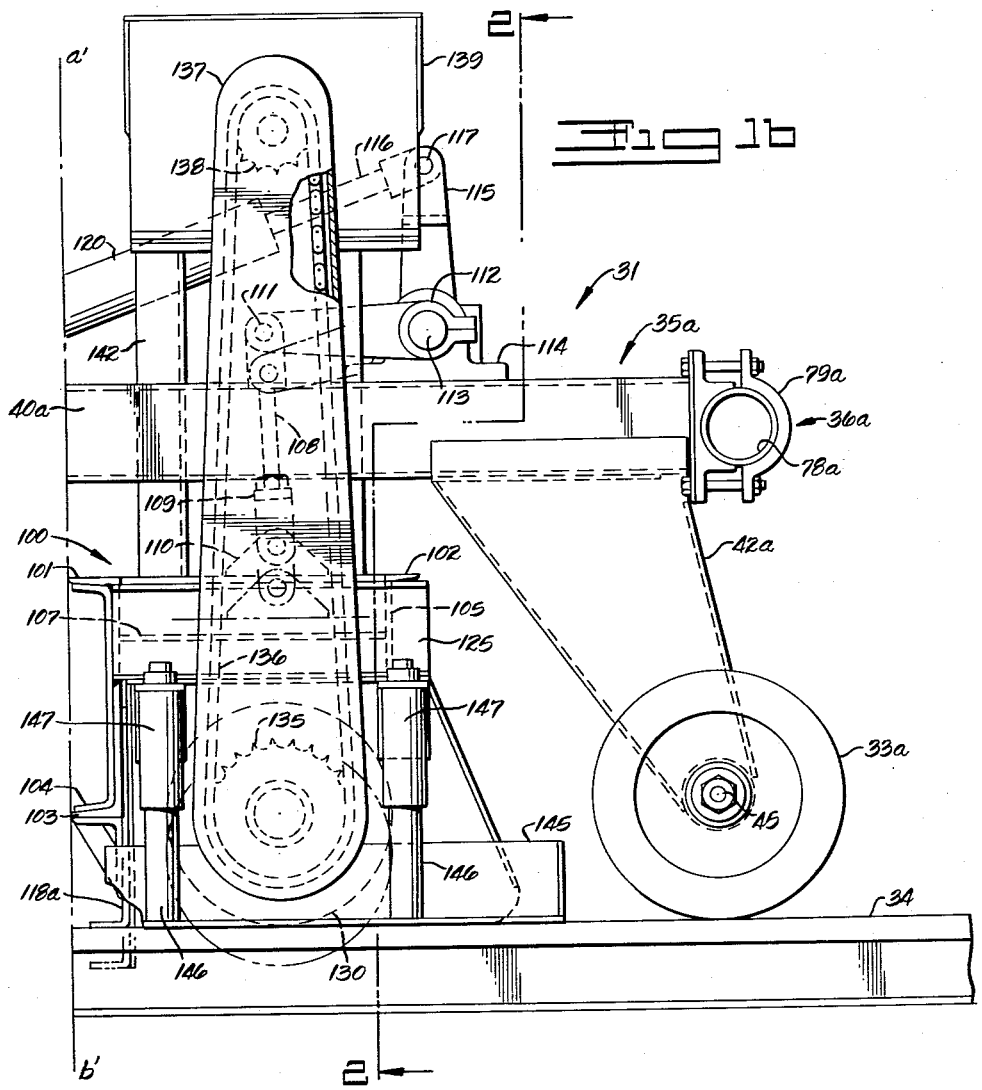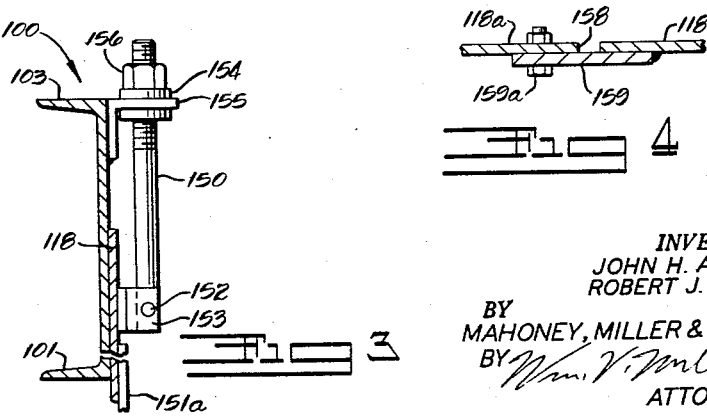

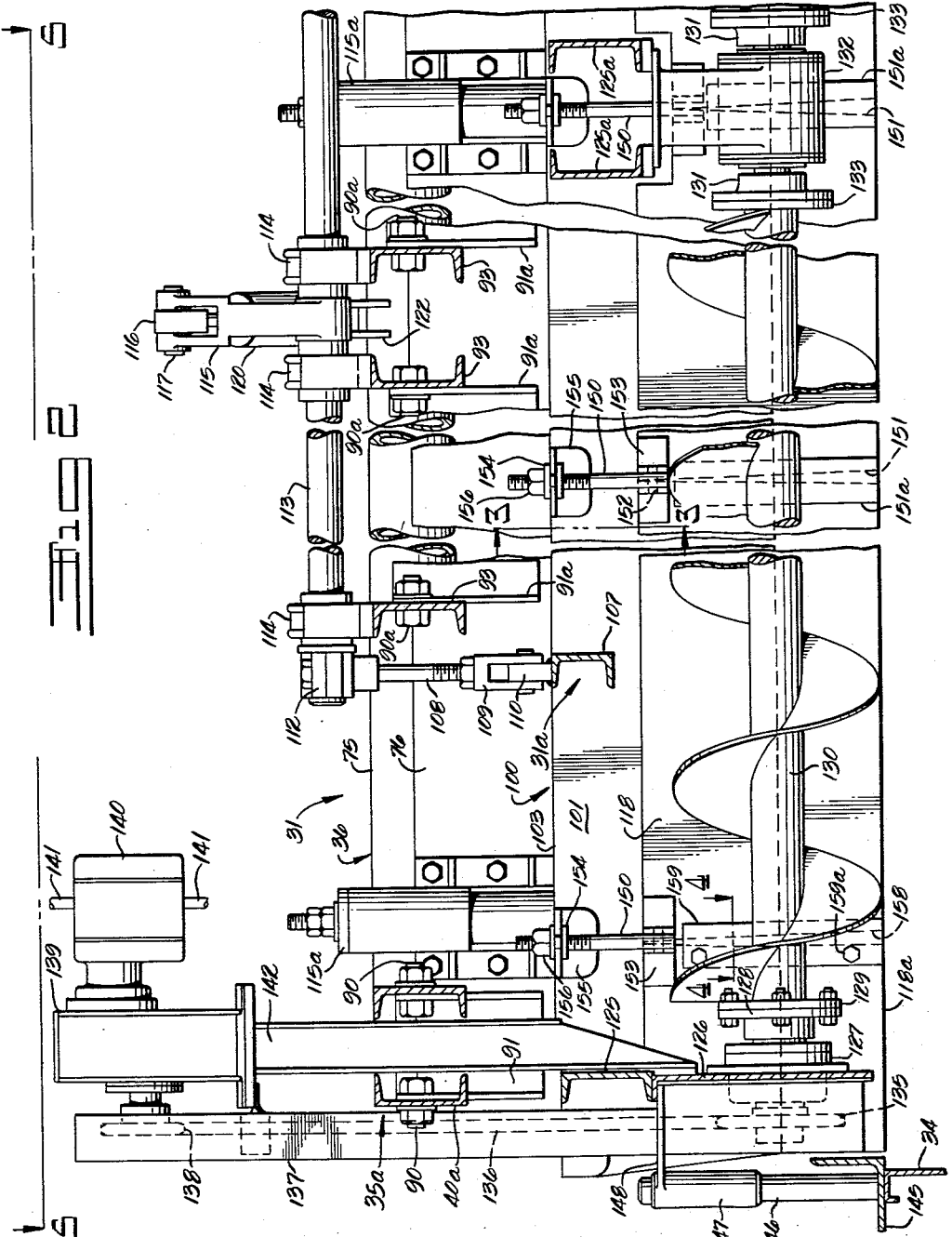

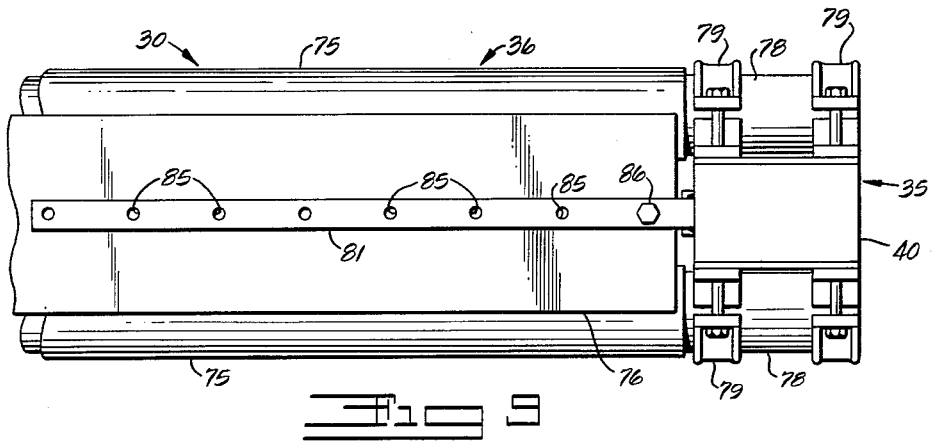
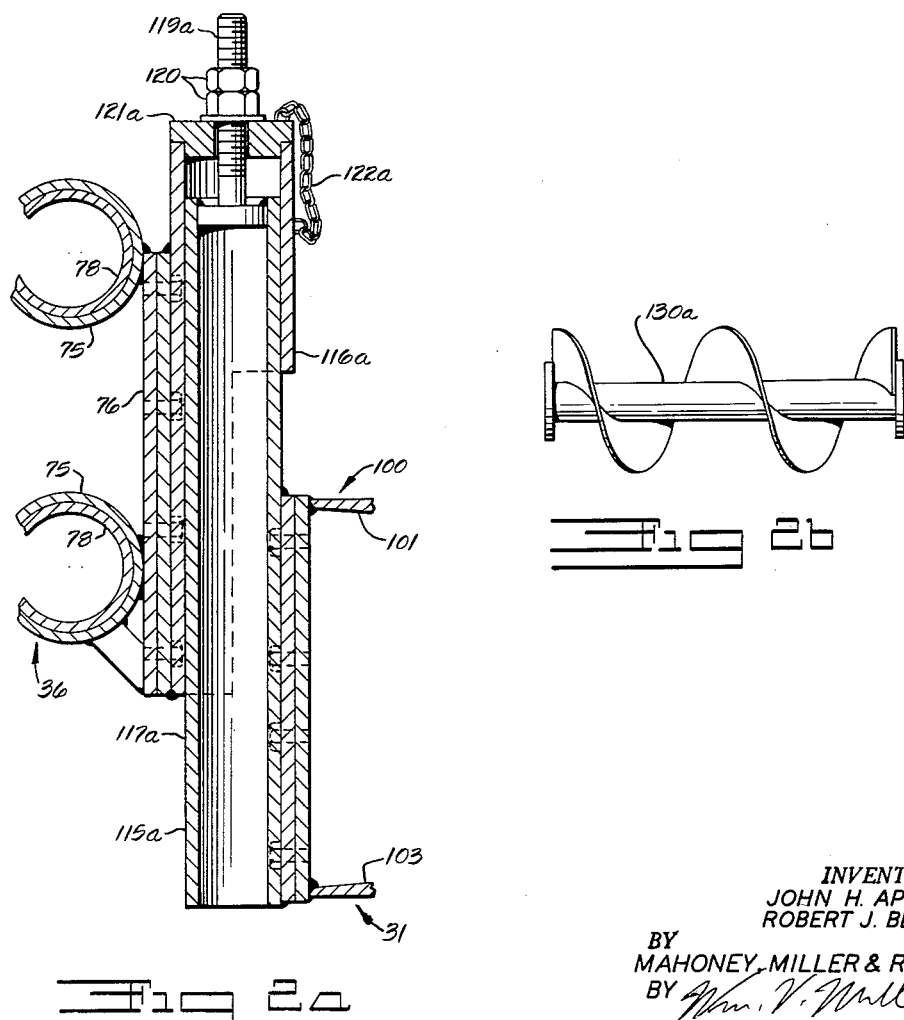

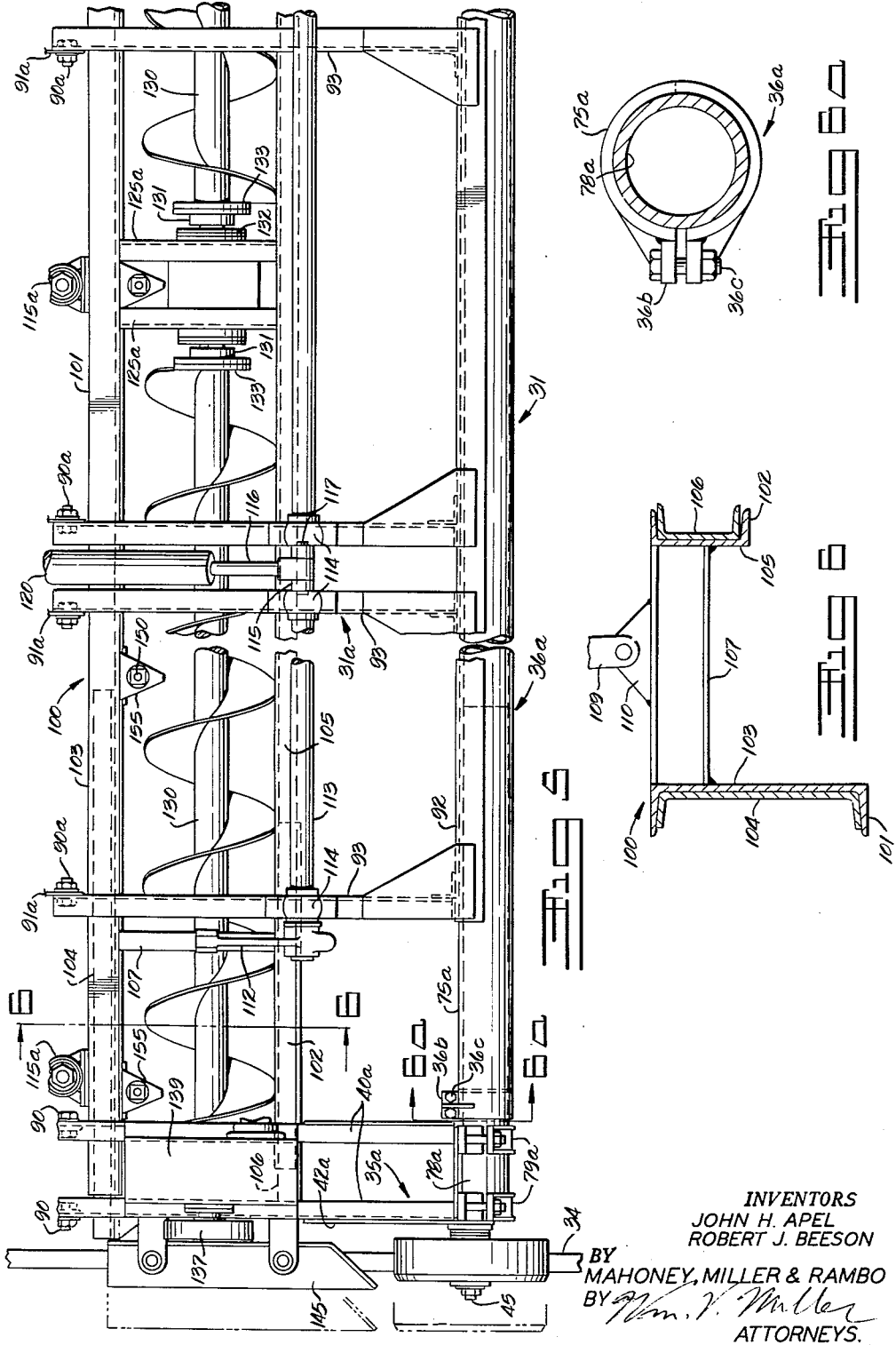

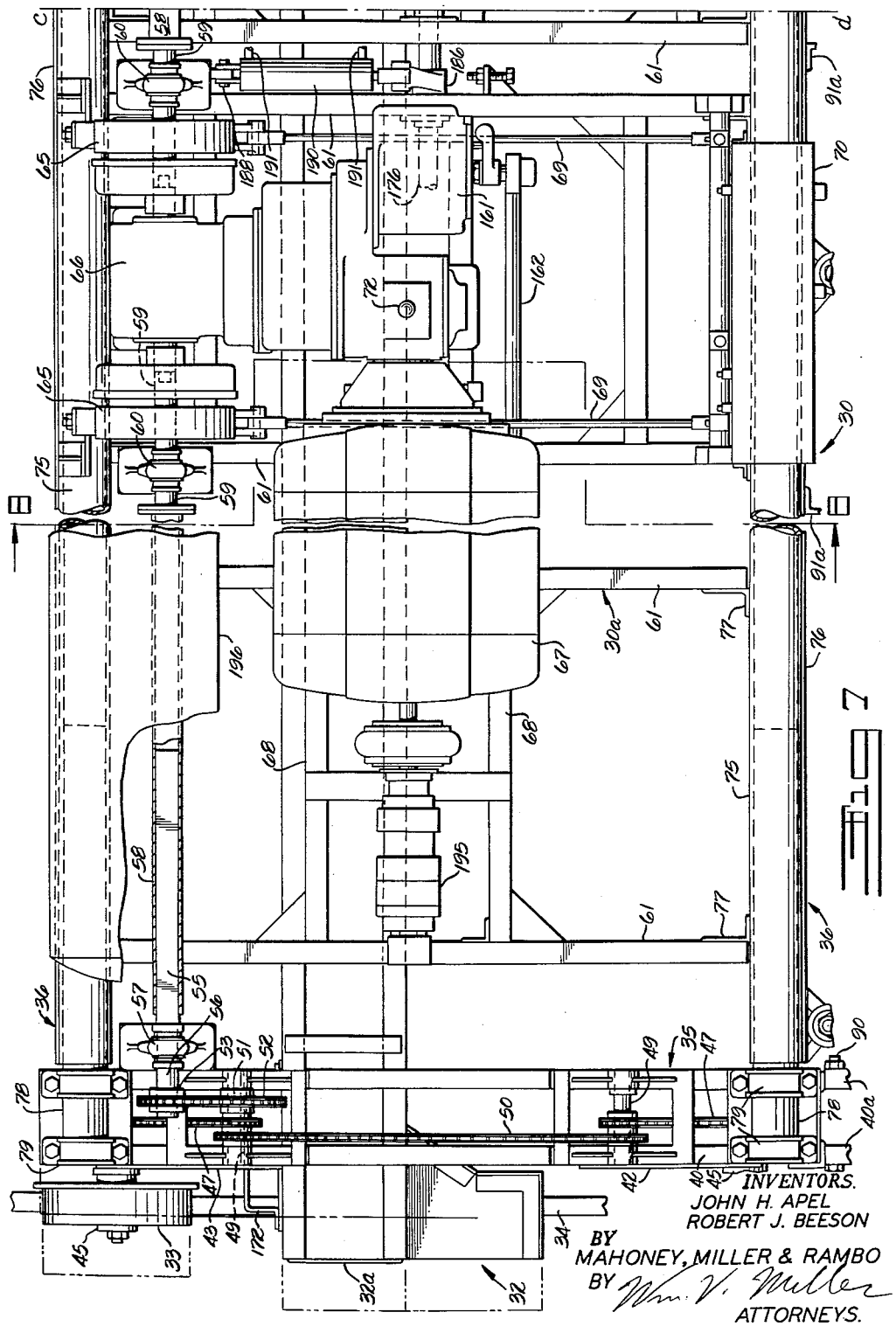

Jan. 2, 1962 J. H. APEL ETAL 3,015,259
PAVING MATERIAL SPREADER
Filed Jan. 26, 1960 10 Sheets-Sheet 8
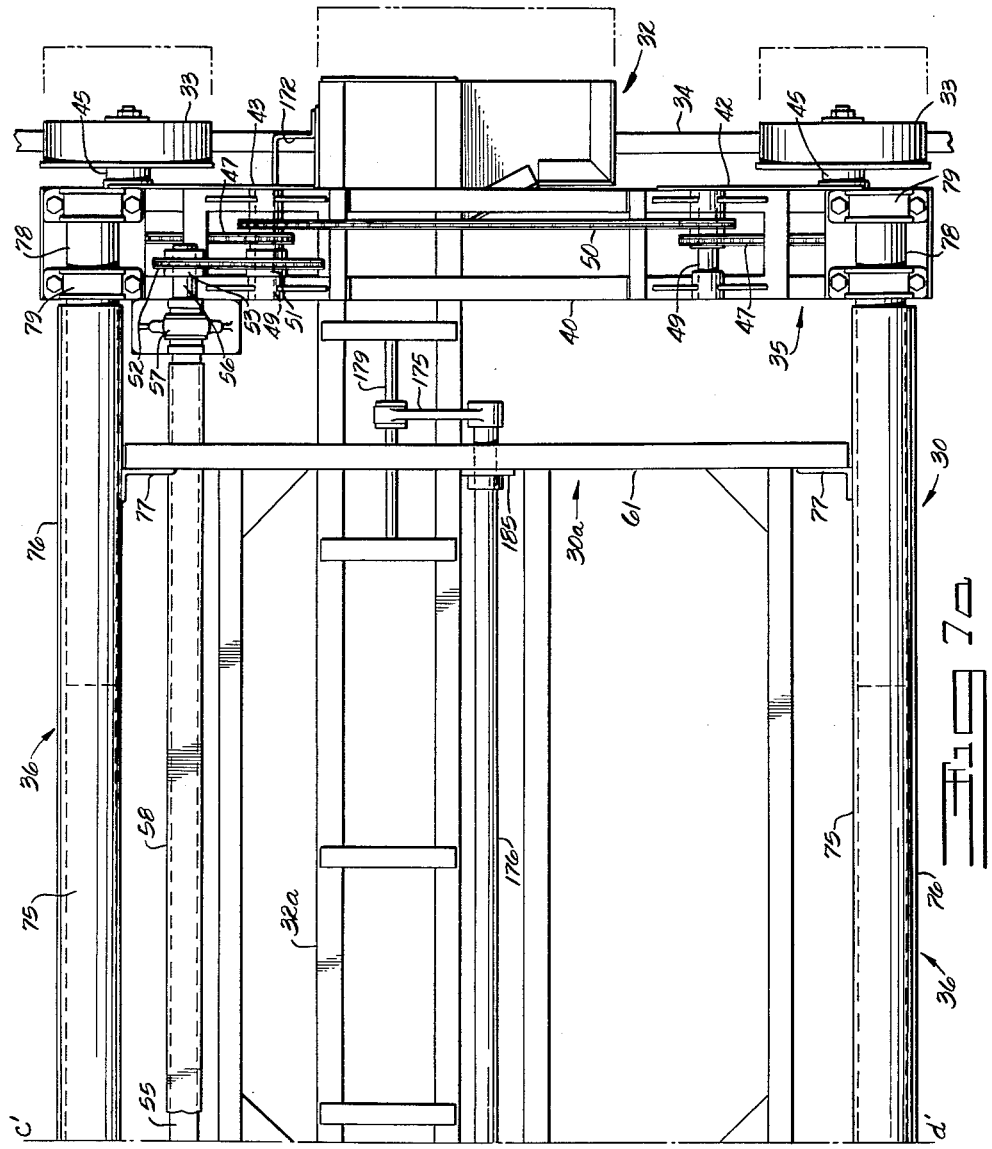
INVENTORS.
JOHN H. APEL
ROBERT J. BEESON
BY MAHONEY, MILLER & RAMBO
BY
ATTORNEYS

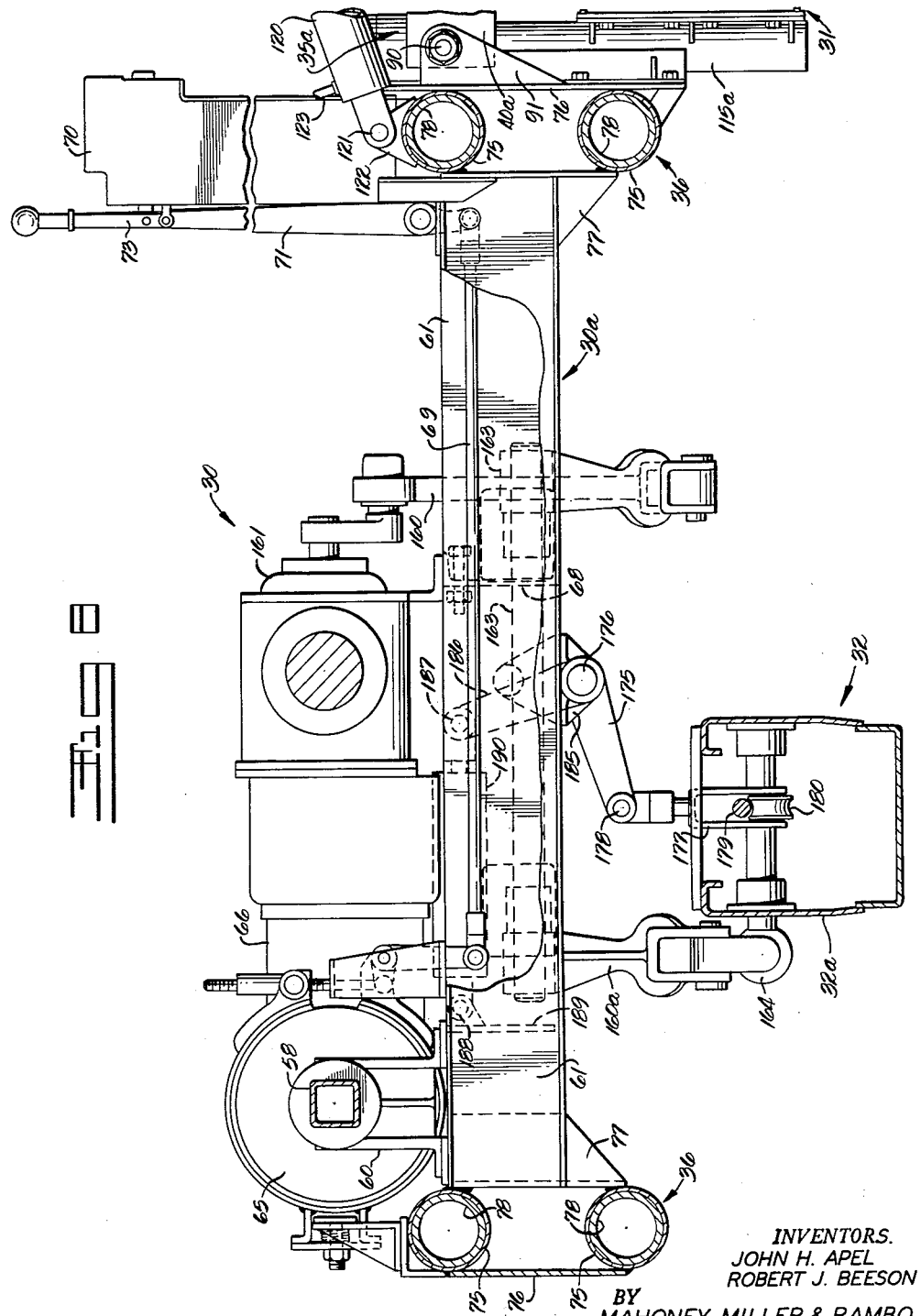

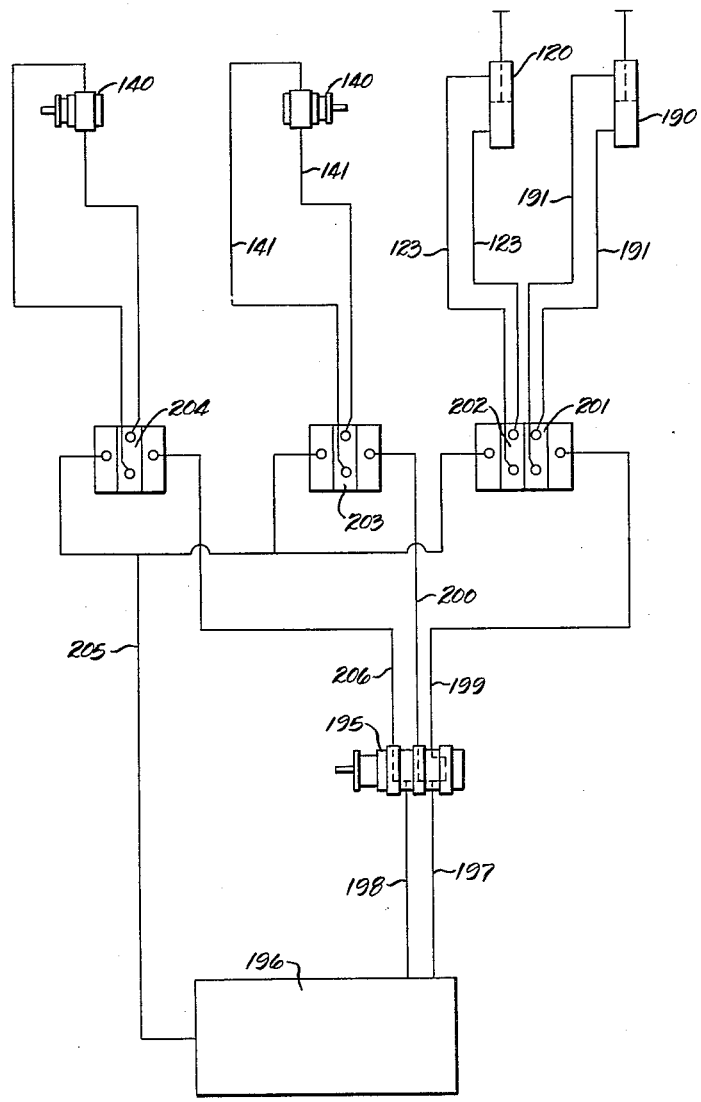
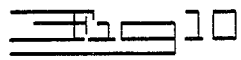
INVENTORS.
JOHN H. APEL
ROBERT J. BEESON
BY MAHONEY, MILLER & RAMBO
BY Wm. V. Miller
ATTORNEYS.

United States Patent Office 3,015,259
Patented Jan. 2, 1962

3,015,259
PAVING MATERIAL SPREADER
John H. Apel, Columbus, and Robert J. Beeson, Hilliards, Ohio, assignors to The Jaeger Machine Company, Columbus, Ohio, a corporation of Ohio
Filed Jan. 26, 1960, Ser. No. 4,642
12 Claims. (Cl. 94—46)

Our invention relates to a paving material spreader. It has to do, more particularly, with a spreading machine which is adapted to operate on side forms to spread material deposited between the side forms and strike it off at a desired level and to thereby form a slab, monolith, or layer of paving material extending from one form to the other and being of a predetermined thickness and crown. The machine is especially suitable for spreading concrete and the following description will refer to concrete but it is to be understood that the machine is not limited in its use of that specific material.

According to our invention, we provide a concrete spreader machine which includes a main frame or truck unit that is supported by side trucks that will operate upon laterally spaced side forms and will function to spread concrete between the two forms evenly and quickly. The concrete spreader machine is preferably propelled through a mechanical transmission which is supported on the frame and which drives the side trucks by means of drive shafts extending to each side truck. The main frame includes transversely extending trusses which are of tubular telescoping construction, providing means for extending or retracting the frame laterally which can be accomplished by extending or retracting the trusses which will selectively position the side trucks in accordance with variations in the spacing of the side forms upon which the machine is to operate. The frame is provided with locks so that each side truck can be independently adjusted laterally in small increments and be held in adjusted position. The drive shafts for the trucks are of the telescoping type so that they may extend or retract automatically as the frame is extended or retracted. Steering of the machine may be aided by two steering clutches, one in each drive shaft, so that either shaft may be independently disconnected from the drive transmission.

The spreader machine conveys concrete, deposited between the side forms, from side-to-side by means of a conveyor unit including a screw conveyor formed of two separate spreader screws mounted across the front end of the machine. The two screws are mounted end-to-end and are carried in bearings at each end of each screw. Each screw is driven independently of the other and can be driven in either direction, and means is provided for controlling one screw independently of the other.

The screws of the conveyor unit and a strike-off structure are carried by a subframe from an outrider frame pivoted to the front end of the main frame or truck unit. The outrider frame is supported by outrider trucks which operate on the side forms ahead of the main frame or truck unit and this frame is also of laterally telescoping construction being connected to the outrider trucks to permit lateral adjustment thereof in accordance with the lateral adjustment of the trucks of the main frame or truck unit. The outrider trucks are pivoted at their rear ends to the main trucks so that they can move vertically relative thereto but will also adjust laterally therewith. The subframe is suspended from the outrider frame by suspension means which includes vertically adjusting means for adjusting the level of the subframe relative to the outrider frame and is preferably hydraulically actuated. The spreader screws are driven from points outside the subframe by suitable drives, which may be hydraulic, that are so located and shielded that the screws may be lowered between the forms to a position in which their lower edges are below the top of the forms to spread the concrete therebetween. Close behind the screw conveyor and supported by the same subframe, we provide an upright strike-off blade or plate which can be adjusted vertically relative to the screw conveyor as desired. The strike-off blade can also be adjusted so that its strike-off edge is flat or has any desired crown. The subframe is also of laterally telescoping construction and is so connected to the outrider frame that it can be extended and retracted in accordance with the lateral extension and retraction of the outrider frame. As the main machine frame or truck unit is extended or retracted laterally in the manner indicated above and the outrider frame and subframe are similarly adjusted, screw sections can be bolted to the ends of one or the other of the main screws producing continuous screws of proper length depending upon the width of the subframe. However, if desired, the spreader screws may be of telescoping form so that they will extend or retract with the frame. The strike-off blade or plate can be extended or retracted in accordance with the change in width of the subframe, by inserting or removing sections of the plate. However, if desired, the blade may have telescoping sections.

Means is also provided for guiding the subframe in its vertical adjustment on the outrider frame. This means preferably includes an adjustable stop arrangement whereby the subframe will return to a predetermined level relative to the main frame after it is raised and then lowered by the conveyor unit suspending means. This will serve to locate the strike-off blade edge and screws at a proper level to produce a layer of material of predetermined thickness.

The main frame or truck unit may also be equipped with a screed which is supported behind the strike-off blade. This screed may be mounted on the frame for reciprocation transversely thereof and may be driven mechanically. It is preferably mounted on the main frame or truck unit so that it can be raised or lowered and this is preferably accomplished by hydraulic means.

In the accompanying drawings we have illustrated a preferred embodiment of our invention but it is to be understood that specific details thereof may be varied without departing from basic principles.

In these drawings:

FIGURE 1 is a perspective view of a spreader machine embodying our invention.

FIGURE 1a is a side elevational view of the rear truck unit or main frame of the machine which matches with the FIGURE 1b view of the front conveyor and strike-off unit of the machine along the line a—b.

FIGURE 1b is a side elevational view of the conveyor and strike-off unit of the machine which matches with the FIGURE 1a view of the main truck unit of the machine along the line $a^1$—$b^1$.

FIGURE 2 is a vertical sectional view taken along line 2—2 of FIGURE 1b through approximately one-half of the width of the conveyor and strike-off unit of the machine.

FIGURE 2a is a detail in vertical section of one of the guide structures provided between the subframe and outrider frame of the conveyor and strike-off unit.

FIGURE 2b illustrates a small section of screw which can be inserted at the end of a screw member.

FIGURE 3 is a vertical sectional view taken along line 3—3 of FIGURE 2 showing a detail of the strike-off blade adjusting means.

FIGURE 4 is a horizontal sectional view taken along line 4—4 illustrating the joint at the adjacent ends of adjacent sections of the strike-off blade.

FIGURE 5 is a plan view of the half of the conveyor and strike-off unit of the machine shown in FIGURE 2 and taken along line 5—5 of that figure.

FIGURE 6 is a vertical sectional view taken along line 6—6 of FIGURE 5 showing the telescoping structure of the conveyor unit subframe.

FIGURE 6a is a sectional view taken along line 6a—6a of FIGURE 5.

FIGURE 7 is a top plan view of one side of the rear or truck unit of the machine and taken along line 7—7 of FIGURE 1a, and which matches with a FIGURE 7a view of the other side of the unit along the line c—d.

FIGURE 7a is a top plan view of the other side of the unit which matches with the FIGURE 7 view of the unit along the line $c^1$—$d^1$.

FIGURE 8 is a vertical longitudinal sectional view of the main frame or truck unit of the machine taken along line 8—8 of FIGURE 7.

FIGURE 9 is an elevational view of one side at the rear of the truck unit taken along line 9—9 of FIGURE 1a.

FIGURE 10 is a schematic diagram of the hydraulic system of the machine.

With reference to the drawings, our machine is illustrated as comprising mainly a rear main frame unit or truck unit 30, a conveyor and strike-off unit 31 extending transversely across the front of the truck unit 30 and carried by such truck unit, and a screed unit 32 which may be provided and which extends transversely beneath the unit 30 and when provided is carried thereby at a location behind the unit 31.

The main truck unit 30 is carried by the flanged truck or traction wheels 33 which operate along the side forms 34 which are spaced a predetermined distance laterally and will form the side edges of the concrete slab to be produced by our machine. The spacing of the forms 34 may vary, as previously indicated, and the main truck frame or truck unit 30 is so constructed that it can be extended or retracted laterally in accordance with such variation. This unit 30 is illustrated best in FIGURES 1, 1a, 7, 7a, and 8.

The truck unit 30 comprises the side trucks 35 extending longitudinally of the machine and each of which is supported by a pair of wheels 33 in tandem. The side trucks 35 are joined together in laterally spaced relationship by means of front and rear frame trusses 36 connected at their outer ends to the front and rear ends, respectively, of the side trucks 35. The trusses 36 are of tubular telescoping construction so that the truck unit or main frame 30 can be widened or narrowed.

Each of the side trucks 35 includes the longitudinally extending, laterally spaced beam members 40 (FIGURES 1, 7 and 7a). These members 40 are provided with front depending bearing supports 42 and the rear depending bearing supports 43 which carry bearings for the axles 45 to which are keyed the wheels 33. The supports 42 and 43 are arranged in pairs of laterally spaced, vertically disposed parallel supports attached to the respective beam members 40 and the laterally spaced bearings thereof receive the stub axles 45.

Each axle 45 is driven by means of a sprocket 46 keyed thereon which, in turn, is driven by the chain 47 from a sprocket 48 keyed on a transverse stub shaft 49 rotatably mounted on the upper edges of the beams 40. The sprockets 48 extend down into the space between the beams 40 and are connected together for simultaneous rotation in the same direction by means of a chain 50 extending along one of the beams 40. The rear shaft 49 also has keyed thereon a driven sprocket 51 which is driven by means of the chain 52 from a driving sprocket 53. The chains and sprockets so far described with reference to the driving of the wheels 33 are enclosed for safety within a guard housing 54 carried above the beams 40, as shown in FIGURE 1.

The sprocket 53 is keyed on the outer end of a driven shaft section 55 which is solid and mainly of square or angular form but which includes an outer cylindrical section 56 that is rotatably mounted in a bearing 57. The cylindrical section 56 has the sprocket 53 keyed thereon and the bearing 57 is carried by the inner beam 40. Thus, the bearing will move laterally with the truck 30 which carries it. The shaft section 55 telescopes inwardly within a hollow driving shaft section 58. The inner end of the shaft section 58 is coupled to another cylindrical section 59 which is rotatably mounted in a bearing 60 carried by one of a plurality of longitudinally extending support frame members 61 which are connected at their front and rear ends to the trusses 36 and maintain such trusses in forwardly and rearwardly spaced parallel relationship.

The shaft structures, including the square telescoping sections 55—58, just described for driving the propelling side trucks 35, are duplicated at each side of the truck unit 30. They can be independently controlled to drive either side 35. This control is accomplished with a steering clutch 65 (FIGURE 7) associated with the inner end of each drive shaft structure. With this clutch arrangement either shaft may be disconnected from or connected to a propelling transmission or drive gear box 66 which is driven by a power unit 67 such as an internal combustion engine. The engine 67 and the gear box 66 are carried on suitable transverse frame members 68 carried by the longitudinal frame members 61. Each clutch 65 is associated with the inner shaft section 59 and is controlled by linkage 69 running forwardly of the frame or truck unit 30 to a control console 70 supported at the front of the unit 30. This linkage is connected to a clutch control lever 71 at the console. The drive connection from the engine 67 to the transmission 66 is reversible by means of a selection lever 72 so that the telescoping truck propelling shafts 55—58 may be driven in either direction to drive the wheels 33 of the trucks 35 in a forward or reverse direction. The speed of the shafts 55—58 is varied by a lever 73. Furthermore, as indicated above, either shaft structure may be selectively connected or disconnected to the propelling transmission 66 by means of its associated clutch 65 which is controlled by the lever 71. Thus, steering of the truck unit 30 is possible by selective actuation of the clutches either while the truck unit is being propelled forwardly or while it is being propelled rearwardly. The reverse lever 72 and the speed lever 73 are located conveniently behind the control console 70.

The frame trusses 36 at the forward and rearward sides of the unit 30 are shown best in FIGURES 1, 1a, 7, 7a, and 8. Each truss comprises a pair of centrally disposed vertically spaced transversely extending tubes or pipes 75 which are rigidly joined together by a plate 76 (FIGURE 8) welded to the outer sides thereof. The forward and rearward trusses 36 are rigidly joined together by a plurality of the laterally spaced, longitudinally extending, parallel supports or beams 61. The ends of these beams 61 may be rigidly joined to the trusses by the upstanding angle brackets 77 which may be bolted to the inner surfaces of the tubes 75 and to the beams 61. Thus, the trusses 36 and the beams 61 are rigidly connected into what may be termed a central frame section designated generally by the numeral 30a.

On the central frame section 30a, the side trucks or side frame sections 35 are mounted for lateral adjustment independently relative to the central frame section. This is accomplished by having the pipe or tube sections 78 rigidly carried by the trucks 35 extending inwardly therefrom and telescoping within the associated outer ends of the slightly larger diameter tubes 75, it being understood that the tubes 78 are vertically spaced and located along the trucks 35 for proper cooperation with the tubes 75. The outer ends of the smaller tubes 78 are rigidly connected to the trucks 35 in the manner shown in FIGURES 1, 1a, 7 and 7a. These connections include the clamps 79 at the forward and rearward ends of the trucks 35 which embrace the tubes 78 and clamp them against the ends of the trucks 35 at the adjacent ends of the beam 40.

Thus, with the above-described frame arrangement there is a central main frame section 30a and a laterally adjustable frame section or truck 35 carried at each side thereof and independently adjustable thereon by the telescoping connections.

Each side truck 35 may be independently adjusted manually relative to the central frame section 30a by sliding the tubes 78 attached thereto in or out relative of the tubes 75. After the adjustment, the truck 35 may be locked in adjusted position by means of lock bars 81 at the rear truss 36 (FIGURE 9). The bars 81 at the rear truss 36 are carried by the side trucks 35 having their outer ends attached to the rear ends of the beams 40. Each bar 81 extends inwardly into overlapping relationship to the plate 76 of the rear truss 36. The bar is provided with a plurality of bolt-receiving openings 85 spaced therealong and each of which may selectively receive a bolt 86 which may be passed therethrough into a receiving opening in the plate 36. Thus, with the clamps 79 released and the bars 81 disconnected from the plate 76, the adjustment of the trucks 35 laterally may be independently obtained provided certain parts of the unit 31 are disconected. Then, the clamps 79 are tightened and the bars 81 are again attached to the plate 76 by positioning the bolts 86 in the selected openings 85 in the bars.

The conveyor and strike-off unit 31 extends across the front of the machine, as previously indicated, and is shown best in FIGURES 1, 1b, 2, 4 and 5. This unit includes a telescopic outrider frame which can be expanded or retracted laterally in accordance with the lateral expansion and retraction of the main frame or truck unit 30. This outrider frame includes a central frame section 31a and outrider side truck or frame sections 35a which are carried on the front or outrider wheels 33a that operate on the forms 34. The side trucks 35a extend longitudinally of the machine and are joined together in laterally spaced relationship by means of a tubular telescoping front frame truss 36a. The outrider side trucks 35a are pivoted at their rear ends to the forward ends of the main trucks 35. These trucks 35 and 35a serve to provide a three wheel supporting bearing at each side of the machine and the front wheel is vertically movable relative to the rear wheels, insuring that there will always be road form contact at the intermediate wheel 33. This results in better distribution of load and vertical movement of the front wheel if it strikes an obstruction on the form.

Each outrider side truck 35a comprises a pair of spaced parallel beams 40a which extend forwardly and rearwardly. The rear ends of the beams 40a are pivoted for movement about a horizontal axis at the pivots 90 (FIGURES 1, 1a, 5 and 7) which are carried by lugs 91 on the forward ends of the beams 40 of the main trucks 35. The forward ends of the beams 40a of each truck 35a are clamped in spaced relationship by means of a clamp 79a to the outer end of a tube section 78a of the front truss 36a. The front ends of the beams 40a carry the depending wheel supports 42a which carry the axle 45 for supporting the outrider wheel 33a. Each tube 78a has its inner end telescoping slidably within the outer end of the main or central tube 75a of the truss 36a. Attached to this tube 75a is a frame member 92 (FIGURE 5) and extending rearwardly from this frame member 92 in laterally spaced relationship are the frame supports 93, all of which are rigidly secured together to form the central frame section 31a. These supports include single supports and double supports. The rear ends of these supports 93 are pivoted by means of the pivots 90a for movement about a horizontal axis which passes through the outer pivots 90. These pivots 90a are carried by lugs 91a which project forwardly from the outer or front plate 76 of the front truss 36 of the main truck unit 30.

It will be apparent that with this arrangement, when either of the side trucks 35 is laterally adjusted, the corresponding outrider side truck 35a will be adjusted laterally to the same extent and in the same direction. This is due to the fact that the pivots 90 connect the side trucks 35 and 35a and the pivots 90a connect the central frame sections 31 and 31a. Furthermore, with the units 30 and 31 in any extended or retracted positions, the outrider frame 31a and the outrider side tracks 35a may be swung vertically about a horizontal axis passing through the pivot points 90 and 90a. This will permit vertical movement of the unit 31 as the machine moves along the side forms 34 without having any substantial effect on the main truck unit 30. The outrider trucks 35a are locked in lateral adjusted position by means of clamps 36b (FIGURES 1, 5 and 6a) formed at the ends of the truss by means of splitting the tube 75a and mounting clamping bolts 36c in association therewith.

The unit 31 also includes a conveyor and strike-off supporting subframe 100 which is suspended from the central outrider frame section 31a and which is laterally extensible and retractable in accordance with the extension and retraction of the truss 36a of the outrider frame which is connected to the outrider side trucks 35a. This subframe 100 is shown best in FIGURES 1b, 2, 5 and 6. It includes the transversely extending rear and forward trusses or beams 101 and 102 which are disposed in parallel relationship. The rear beam 101 includes the central or main channel 103 and the end channels 104 which slidably telescope or interfit therewith. The forward beam 102 includes the central channel 105 which slidably receives the end channels 106. The channels 103 and 105 are rigidly joined together by forwardly and rearwardly extending support braces 107 which may be welded thereto and which may be provided in suitable number. The frame 100 is suspended from the central frame section 31a by means of rods 108 which are adjustably connected to yokes 109 that straddle upstanding lugs 110 on the braces 107 (FIGURES 1b, 2 and 6). One of these suspending rod structures is associated with each of the outermost braces 107 of the frame 100 adjacent the corresponding outer ends of the channels 103 and 105. The upper end of each suspending rod 108 is connected by a pivot 111 to the forward end of a rocker arm 112 that is non-rotatably clamped or keyed at its forward end to a transversely extending rock shaft 113 which is rotatable in bearings 114 carried by the supports 93 of the central frame section 31a. Midway of the ends of the shaft 113 a rocker arm 115 is non-rotatably secured thereon in upstanding position. The upper end of this arm is bifurcated and receives the outer end of the piston rod 116 which is pivoted thereto at 117. This piston rod projects forwardly and upwardly from the ram 120 which may be of a fluid-actuated type such as a hydraulic ram. The rear or lower end of the cylinder of this ram 120 is pivoted at 121 to an upstanding lug structure 122 (FIGURES 1a and 8) carried on the tube 75 of the truss 36 of the main truck unit 30. The ram 120 is preferably of the double-acting type and is controlled by fluid lines 123 which include flexible sections. It will be apparent that by controlling the ram 120, the shaft 113 may be rocked through the rocker arm 115. Rocking of the shaft 113 rocks the arms 112 carried at the outer ends thereof to raise or lower the frame 100. Thus, the frame 100 may be adjusted vertically as desired.

To guide the frame 100 in its vertical movement, guide arrangements 115a of the type shown in detail in FIGURE 2a and located in FIGURES 2 and 5, are provided. One of these guide arrangements is provided at each end of the frame 100 and one midway of the ends of the frame as indicated. These will guide the vertical movement of the frame 100 regardless of the lateral positions of the trucks 35a relative to the central frame section 31a.

Each arrangement 115a as shown in FIGURE 2a comprises an upstanding sleeve-like guideway 116a which is attached to the front surface of the plate 76 of the front truss 36 of the main truck unit 30. Disposed for vertical sliding movement in the guideway 116a is a guide 117a of cylindrical form. This guide 117a is attached at its lower end to the main section 118 of a strike-off blade structure that is rigidly attached to and carried by the frame 100 as will later appear. The guideway 116a is open at its upper and lower ends and the guide 117a extends from the lower end thereof. Non-rotatably attached to the upper end of the guide 117a and extending upwardly therefrom is an adjustable stop-carrying screw 119a which carries stop nuts 120. The screw 119a normally extends upwardly through a central opening in a removable cap 121a which normally rests upon the upper end of the member 116a and has a lower locating reduced portion that fits thereon. The cap 121a is attached to the member 116a by a chain or other flexible member 122a. The screw 119a is slidable vertically in the cap 121a. The lower position of the guide 117a in the guideway 116a will be determined by the stop nuts 120a. However, if the cap 121a is removed, the member 117a may move even farther downwardly relative to the member 116a. Ordinarily, the nuts 120a will cooperate with the cap 121a to determine the lowermost position of the frame 100 after it is once raised and then lowered by operation of the ram 120. If desired, the stop arrangement can be eliminated at the central unit 115a.

The outer ends of the outer channel beams 104 and 106 of the frame 100 are rigidly connected together in parallel relationship by means of the forwardly and rearwardly extending support channels 125. Similar double support channels 125a are provided facing each other at the center of the frame 100 between the central channels 103 and 105. Depending from each of the outer support channels 125 is a plate 126 which carries a bearing 127 in which the outer end or drive section 128 of a conveyor or material spreading screw member 130 is rotatably mounted. This section 128 is coupled to the main section of the screw member 130 at a coupling 129. The inner end section 131 of the screw member 130 is rotatably carried in a double bearing structure 132 which depends from and is supported by the central supports 125a of the frame 100. The main part of the screw 130 is coupled at 133 to the bearing section 131. The screw arrangement is identical at both sides of the unit 31.

Each screw 130 is driven independently of the other in a forward or reverse direction. The drive for each screw comprises a driven sprocket 135 keyed on the outer end of the section 128 and which is driven by a chain 136. This chain 136 passes upwardly through a guard 137 and passes around an upper driving sprocket 138. The sprocket 138 is mounted on a shaft carried and driven by a gear box 139. This box 139 is driven by a motor 140 which is preferably a hydraulic motor. This motor 140 is controlled by hydraulic lines 141 which preferably include flexible sections. Thus, each conveyor screw section 130 can be driven independently in either direction by selectively controlling the motors 140. Furthermore, vertical movement of the frame 100 will not interfere with the drive connection as it will be noted that the gear box 139 and motor 140 are carried on the upper end of a pedestal or support 142 which has its lower end attached to the adjacent end support 125 of the frame 100. Thus, the drive for the screw member 130 will move vertically with it as it is adjusted vertically with the frame 100. It will be noted that the pedestal 142 will slide vertically between the beams 40a of the side trucks 35a and that the pedestal support 142 will move laterally with the trucks 35a when they are adjusted laterally. When such lateral adjustment is made, this will move the frame supports 125 in and out to retract or extend the frame 100. The effective length of the conveying screws may be varied by insertion of or removal of short screw sections 130a (FIGURE 2b) at the coupling 129.

The plate 126 also carries a shoe 145 which will always be in contact with and slide along the associated form 34 regardless of the operative vertical position of the frame 100 and the screw 130 carried thereby. However, when the frame 100 is lifted to a transporting height the shoe 145 will be lifted with it. This shoe 145 is carried for floating movement relative to the plate 126. The shoe is provided with a pair of upstanding guide rods 146 which are mounted for vertical sliding movement in guide sleeves 147 that are attached by brackets 148 to the plate 126. Thus, it will be apparent that upon vertical movement of the frame 100 the shoes 145 will remain in contact with the forms 34. These shoes will serve to prevent feeding of material by the screw members 130 outwardly over the upper edges of the forms 34.

The strike-off structure is located directly behind the conveyor which includes the screw members 130 and as indicated above includes the main blade section 118 which is disposed in upright position and is carried adjustably by the rear frame channel 103 of the frame 100 from which it depends. The main blade section 118 is supported from the beam section 103 (FIGURES 2 and 3) by adjusting rods 150 which are located longitudinally of the beam 103. Adjacent each rod the blade section 118 is slit upwardly a substantial distance from its lower edge, the slits being indicated by the numeral 151 in FIGURE 2 and being covered at the front by small plates 151a (FIGURE 3) attached to the face of the plate 118 at one side only of the slit. Each rod 150 is pivotally connected at its lower end by a transverse pivot pin 152 to lugs 153 secured to the face of the blade section 118 adjacent its upper edge. The upper end of each rod 150 is threaded through a grooved collar 154 and nut 156 which is carried by a clip 155 that is fastened to the face of the beam section 103. Adjustment of the nut 156 on the rod 150 will obviously exert a downward push or an upward pull on the blade 118. Consequently, the blade can be adjusted up or down or crowned properly by selectively adjusting the rods 150. The slits 151 provide sufficient flexibility in the blade section 118 to permit the crowning adjustment.

At each outer end of the plate 118, short removable blade sections 118a may be removably mounted in alignment with the section 118. The joint 158 between the adjacent ends of these sections 118 and 118a (FIGURE 4) is covered by a plate 159 which is welded to the end of the section 118 only and removably bolted by bolts 159a to the other section. The section 118a may be replaced with longer or shorter sections as the side trucks 35a are moved out or in and the frame members 125 are adjusted out or in.

Thus, from the above it will be apparent that the unit 31 will be carried across the front of the unit 30 and can pivot vertically relative thereto about an axis at the rear of the unit 31 which passes through the pivots 90 and 90a. The subframe 100 can be adjusted vertically on the unit by actuating the ram 120. The frame 100 will be guided in its vertical adjustment by the units 115a. This vertical adjustment will move the conveyor screw and the strike-off blade vertically, even down between the side forms 34. The lowermost position of the screw conveyor members 130 and associated strike-off blades 118 and 118a can be predetermined by the stop nuts 120a on the rods 119a. The lower edges of the blade sections 118 and 118a may be adjusted relative to the screw members 130 by adjusting the nuts 156 of the rods 150 and the blade sections 118 may be crowned by selective adjusting of the rods 150 which carry it. The subframe 100 will extend or retract in accordance with the extension and retraction of the outrider frame, if the strike-off and screw structures are disconnected therefrom, since its ends are connected to the outrider trucks 35a for lateral adjustment therewith but is still free to be adjusted vertically relative thereto.

As indicated previously, a screed unit 32 may be provided on the truck unit 30 at a suitable location behind the spreading conveyor and strike-off unit 31. We have illustrated this screed unit as being of the transversely reciprocating or oscillating type but our invention is not limited to that type. The screed 32 is located intermediate the front and rear ends of the truck unit 30, as shown best in FIGURE 1a.

The screed unit 32 is shown best in FIGURES 1, 1a, 7, 7a, and 8. The screed 32a itself of the unit is of rigid construction and is associated with the truck unit 30 of the machine, so that it can be reciprocated and can be elevated. In actual use, as shown in FIGURES 1 and 1a, this screed rests on the side forms 34. The screed itself may be of the detailed box beam structure disclosed in the patent to Millikin No. 2,299,700.

The screed 32a ordinarily rests on the forms 34 and can be reciprocated while so supported transversely relative thereto. The reciprocating means comprises a crank and pitman mechanism 160 (FIGURES 7 and 8) driven by a gear box 161 from the engine 67. This mechanism 160 oscillates a rearwardly extending shaft 162 which is carried by bearings 163 on one of the frame supports 61 of the central frame section 30a. The shaft 162 at its rear end connects to another crank and pitman mechanism 160a which connects to the screed 32a at a pivot connection 164 (FIGURE 8). The screed 32a may be backed up by thrust rollers 170 (FIGURE 1a) which engage the rear surface thereof. These thrust rollers are carried in vertical positions by brackets 171 which are attached to the rear wheel supports 43 of the trucks 35. The screed 32a carries U-form bands 172 which provide elongated guide connections between the screed 32a and the rollers 170. This arrangement permits the screed to be reciprocated relative to the rollers 170 but still keeps the screed in association with the rollers. Furthermore, it permits the rollers 170 to move in and out with the trucks 35 and to always support the screed 32a adjacent the forms 34. Also, since the bands 172 are of much less height than the rollers, vertical movement of the screed relative to the rollers is permitted.

For lifting the screed from the forms 34 when desired, we provide screed lifting means which will not interfere with the reciprocation thereof by the crank and pitman structures 160 and 160a. Furthermore, it will be obvious that the crank and pitman structures will permit this vertical movement.

The lifting means comprises lift arms 175 (FIGURES 7a and 8) which are carried on a rock shaft 176 adjacent the supports 61 at the outer sides of the central frame section 30a. Suspended from the rear ends of the arms 175 are the yokes 177 which have their upper ends pivoted thereto at 178. The yokes 177 straddle rods 179 and carry beneath the rods the grooved rollers 180. Each rod 179 is of elongated form and extends longitudinally of the screed 32a, being rigidly carried thereby. As the screed reciprocates the rods 179 merely roll on the rollers 180. Rocking of the shaft 176 properly will raise or lower the arms 175.

The shaft 176 is rotatably carried in bearings 185 on the frame members 61 and is rocked by means of a rocker arm 186 (FIGURES 7 and 8) keyed thereon midway of its length and upstanding therefrom. This arm 186 has its upper end pivoted at 187 to the forward end of the piston rod of a ram 190. The ram 190 is a double-acting ram and is controlled by means of lines 191 which include flexible sections. The rear end of the ram is pivotally carried at 188 by a support 189 on the frame section 30a. Thus, by operating the ram 190, the screed 32a may be lifted or lowered on the frame 30a relative to the side forms 34.

The engine 67 also drives a hydraulic pump 195 supported by the main frame section 30a of the unit 30 as shown in FIGURE 7. This pump supplies hydraulic fluid for the various hydraulic units of the machine. Also, carried by the frame section 30a is a tank 196 (FIGURES 1 and 7) for hydraulic fluid.

The hydraulic system is illustrated diagrammatically in FIGURE 10. The pump 195 is a triple pump and is connected to the tank 196 by a pair of lines 197 and 198. Lines 199, 200, and 206 lead from the pressure side of the pump. The line 199 supplies fluid to a pair of valves 201 and 202, the line 200 supplies fluid to a valve 203 and the line 206 supplies fluid to a valve 204. All these valves are connected to a return line 205 which connects to the tank 196. All the control valves mentioned will be mounted on the control console 70 convenient for the machine operator.

All the valves 201, 202, 203 and 204 are of the same type, being of the four-way, three position type, and shiftable in either direction. Valves 201 and 202 are spring-centered in neutral position, and valves 203 and 204 are detent positioned in a forward or reverse position.

The valve 201 is connected to the screed lift cylinder 190 by the lines 191. The valve can be moved from neutral position to raise or lower the screed 32a. The valve 202 is connected by the lines 123 to the lift cylinder 120 which controls the level of the subframe 100 that carries the screws 130 and the strike-off blades 118 and 118a. The frame 100 may be raised or lowered by moving the valve from neutral in the proper direction. The valve 203 is connected to one of the hydraulic screw drive motors 140 by the lines 141 and the valve 204 is connected to the other motor in a similar manner. Movement of either valve 203 or 204 from neutral will drive the corresponding motor in a forward or reverse direction as desired. Thus, either screw 130 will be driven in the proper direction.

In the use of this machine, with the subframe 100 adjusted to the correct level by operation of the ram 120 to position the screws 130 and the strike-off blades 118—118a at the proper level to produce a layer of material of desired thickness, the machine is propelled along the forms 34 and the screws 130 will engage the material and spread it as desired between the forms. The reversely pitched screws 130 will be controlled independently by the drive motors 140 to spread the material back and forth between the forms as desired. The outrider frame which carries the subframe will be free to pivot vertically if the outrider wheels 33a are moved vertically by passing over an out of line form joint or bump of material on the forms. Therefore, this will not raise the truck unit 30 which carries the screed 32a. Also, contact of all three wheels at each side of the machine will always be maintained. The screed 32a will be sliding along the forms since when the machine is operating it is lowered into this position by operation of the screed lift ram 190. The machine is adjusted before operation, in accordance with the spacing of the side forms by lateral adjustment of the main truck 35 and the outrider trucks 35a. The machine may be steered by selective actuation of the drive clutches 65. The level of the subframe 100 may be varied and the stop nuts 120a may be set to always return it to a predetermined position. The strike-off level relative to the screws 130 may be varied and the strike-off may be crowned. The material will first be engaged by the screws 130 which will spread it, will then be engaged by the strike-off blades 118—118a which will strike it off to a rough level and crown and will finally be engaged by the screed 32a which will accurately level and finish the surface.

It will be apparent from the above that we have provided a paving machine having many advantages. Some of the advantages have been discussed and others will be apparent.

Having thus described our invention, what we claim is:

1. A road paving machine comprising a main truck unit and a spreader unit, said spreader unit including a screw conveyor for conveying material laterally of the spreader unit as the machine is propelled along the surface to be paved, said main truck unit comprising propelling side trucks at each side thereof having driven traction members, means connecting said propelling trucks on said main truck unit for lateral adjustment, propelling means on said main truck unit for driving said propelling trucks and including a power unit, mechanical means for transmitting power from said power unit to said trucks, said mechanical means comprising a telescoping shaft structure extending from said power unit to each of said trucks so that the drive thereto can be maintained in various positions of lateral adjustment, said spreader unit also comprising an outrider frame connected to the front end of said main truck unit, said outrider frame including outrider trucks pivotally connected at their rear ends to the forward ends of said propelling trucks for relative vertical movement, laterally telescoping means for connecting said outrider trucks together, said outrider frame carrying a subframe for supporting the screw conveyor, means connected between said outrider frame and said subframe for suspending said subframe from said outrider frame for vertical movement relative to said outrider frame, said subframe having telescoping sections which are connected to said outrider trucks, said suspending means being supported from said outrider frame and interfitting vertical guide means being provided between said main frame and said subframe.

2. A road paving machine according to claim 1 in which said guide means includes stop means for predetermining the lower level of said subframe.

3. A road paving machine according to claim 2 in which said subframe also carries a strike-off blade behind said screw conveyor, and means for vertically adjusting said blade relative to said screw conveyor.

4. A road paving machine according to claim 3 comprising means for driving said screw conveyor, said means comprising a flexible driving connection between said main truck unit and said screw conveyor.

5. A road paving machine according to claim 3 in which said screw conveyor comprises opposed screw members, and said driving connection comprising means for driving either of said members.

6. A road paving machine according to claim 3 including a screed unit carried by said main truck unit behind said strike-off blade.

7. A road paving machine comprising a main truck unit and a spreader unit, said spreader unit including a screw conveyor for conveying material laterally of the spreader unit as the machine is propelled along the surface to be paved, said main truck unit comprising propelling side trucks at each side thereof having driven traction members, means connecting said propelling trucks on said main truck unit for lateral adjustment, said spreader unit also comprising an outrider frame connected to the front end of said main truck unit, said outrider frame including outrider trucks pivotally connected at their rear ends to the forward ends of said propelling trucks for relative vertical movement, laterally telescoping means for connecting said outrider trucks together, said outrider frame carrying a subframe for supporting the screw conveyor, means connected between said outrider frame and said subframe for suspending said subframe from said outrider frame for vertical movement relative to said outrider frame, said subframe having telescoping sections which are connected to said outrider trucks, said suspending means being supported from said outrider frame and interfitting vertical guide means being provided between said main frame and said subframe.

8. A road paving machine according to claim 7 in which said guide means includes stop means for predetermining the lower level of said subframe.

9. A road paving machine according to claim 8 in which said subframe also carries a strike-off blade behind said screw conveyor, and means for vertically adjusting said blade relative to said screw conveyor.

10. A road paving machine according to claim 9 comprising means for driving said screw conveyor, said means comprising a driving unit on said main truck unit and a flexible driving connection between said driving unit and said screw conveyor.

11. A road paving machine according to claim 9 in which said screw conveyor comprises opposed screw members, and said driving connection comprising means for driving either of said members.

12. A road paving machine according to claim 9 including a screed unit carried by said main truck unit behind said strike-off blade.

References Cited in the file of this patent
UNITED STATES PATENTS

| | | |
|---|---|---|
| Re. 20,611 | Nickerson | Jan. 4, 1938 |
| 1,662,257 | Valerio | Mar. 13, 1928 |
| 1,817,161 | Mosel | Aug. 4, 1931 |
| 2,054,263 | McCrery | Sept. 15, 1936 |
| 2,269,109 | Jackson | Jan. 6, 1942 |
| 2,303,336 | Day | Dec. 1, 1942 |
| 2,393,954 | Baker | Feb. 5, 1946 |
| 2,651,979 | Jackson | Sept. 15, 1953 |
| 2,902,908 | Schiavi | Sept. 8, 1959 |